E. R. SHATTUCK.
Coffee-Filters.
No. 158,532. Patented Jan. 5, 1875.
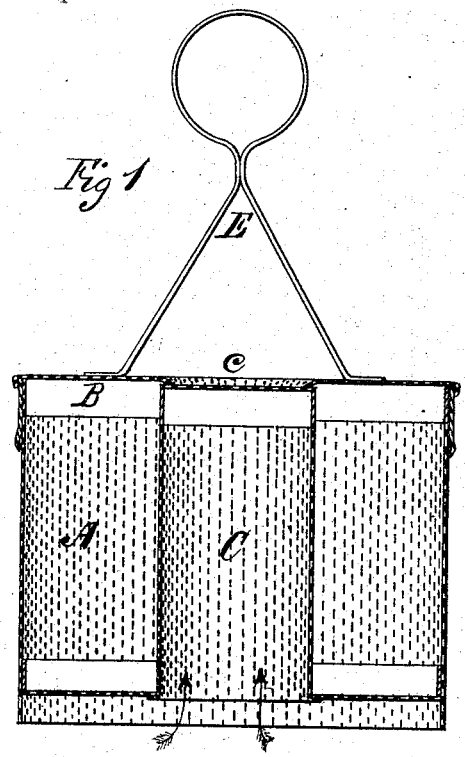
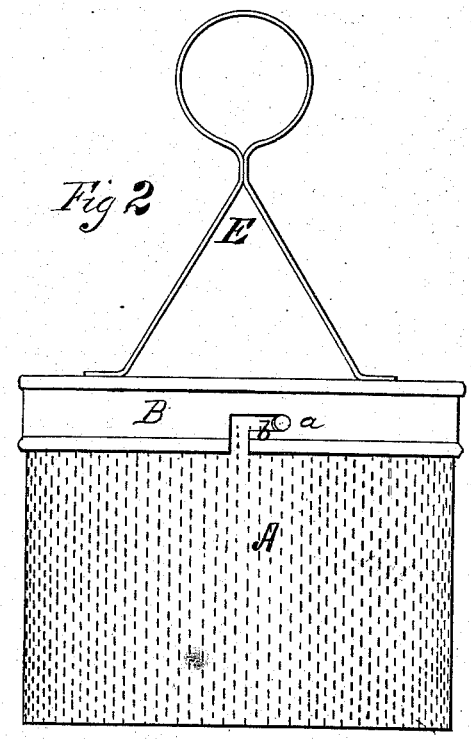
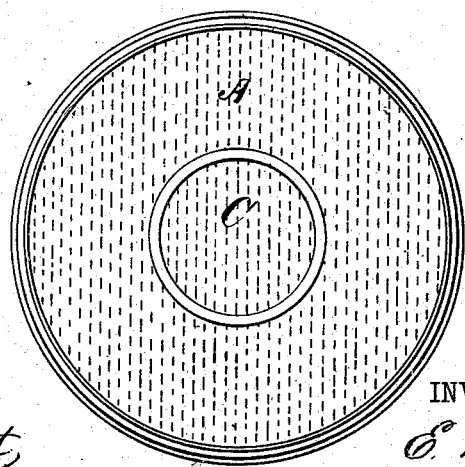
WITNESSES
Robert Everett
E. H. Bates
INVENTOR
E. R. Shattuck
Chipman Hosmer & Co
Attorneys

UNITED STATES PATENT OFFICE

EDWIN R. SHATTUCK, OF OLEAN, NEW YORK.

IMPROVEMENT IN COFFEE-FILTERS.

Specification forming part of Letters Patent No. 158,532, dated January 5, 1875; application filed August 25, 1874.

*To all whom it may concern:*

Be it known that I, EDWIN R. SHATTUCK, of Olean, in the county of Cattaraugus and State of New York, have invented a new and valuable Improvement in Coffee Filters and Steepers; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a sectional view of my coffee filter and steeper. Fig. 2 is a side view, and Fig. 3 is a bottom view, of the same.

This invention has relation to means for steeping and filtering coffee, wherein two reticulated metal cylinders, concentrically arranged, are employed; and the nature of the invention consists in an outer cylinder having a detachable reticulated top, and a fixed reticulated centrally-perforated bottom, in combination with an inner cylinder having an open bottom and a closed but reticulated top, the latter being rigidly secured within the former, whereby the filter, when suspended in boiling water, will allow it ready access and exit to the coffee in the annular space between the two cylinders, not only from its sides and interior, but also from its bottom and top, thereby rapidly extracting the strength and aroma of the coffee, as will be hereinafter more fully explained.

In the annexed drawings, A designates a cylindrical reticulated metal vessel, in which I shall exemplify the use and application of my improvement. As will be seen from an examination of Fig. 2, it is provided with a detachable top, B, which may be securely locked to the cup by means of the bayonet attachment *a b*, and the said top is also provided with a central perforation, *c*, and a handle, E, for a purpose hereinafter to be explained. C designates a reticulated metal cylinder having one end closed, but likewise reticulated or perforated, which is centrally applied and rigidly secured to the strainer A by means of solder and radial braces, with its open end downward.

When the coffee is put into the cup of the strainer A it will assume an annular form, owing to the cylinder C. If the top B be now secured to the body of the strainer by means of the catch *a b*, or its equivalent, and the vessel be lowered into a pot of boiling water, not only the top, bottom, and sides of the coffee will be exposed to the direct action of boiling water, but also the interior surface thereof, as the water will freely boil up through the cylinder C, causing every grain of coffee to be thoroughly acted upon, and its substance to be thoroughly extracted.

The object of providing the upper end of the inner cylinder with a reticulated top is to delay the water slightly in its progress through it, in order that the grains may be more thoroughly acted upon, and this is the more important, as the flow of water through this portion of the filter is more rapid than through any other part.

Where coffee is prepared, as in hotels and steamboats, for a large number of guests, the filter A will of necessity be of large size. I shall then use a number of reticulated cylinders, C, so spaced as to cause every part of the coffee in the annular space between the central cylinder and the peripheral walls of the vessel to be freely acted upon by the boiling water.

In strainers heretofore used, a reticulated box with a detachable top is common; but this construction is open to this objection, that the central portion of a mass of ground coffee placed therein is but little, if at all, acted upon by the boiling water, and, consequently, its strength and substance are not thoroughly extracted.

This objection is remedied by the use of one or more reticulated cylinders passing through the coffee, thus subjecting the center of the mass to the action of the water, and obtaining its full strength and flavor.

I am well aware that two reticulated cylinders, concentrically arranged, the larger having a perforated bottom and removable imperforate cover, the smaller cylinder being removably applied within the larger, and open both at top and bottom, are not new; hence I do not claim them broadly.

What I claim as new, and desire to secure by Letters Patent, is—

The combination of the outer reticulated cylinder A, having a detachable reticulated cover, B, provided with a central aperture, c, and a bail, E, and the inner cylinder C, having a fixed reticulated top, and an open bottom, the latter rigidly secured within the former cylinder, as specified, and for the purpose set forth.

In testimony that I claim the above I have hereunto subscribed my name in the presence of two witnesses.

E. R. SHATTUCK.

Witnesses:
J. F. JOHNSON,
WM. J. SHERMAN.